United States Patent [19]
Fujii

[11] Patent Number: 5,818,918
[45] Date of Patent: Oct. 6, 1998

[54] PERSONAL HANDY PHONE SYSTEM

[75] Inventor: Shigeo Fujii, Tokyo, Japan

[73] Assignee: NEC Corporation, Tokyo, Japan

[21] Appl. No.: 656,526

[22] Filed: May 31, 1996

[30]   Foreign Application Priority Data

Jan. 6, 1995 [JP] Japan ................................. 7-134965

[51] Int. Cl.⁶ .............................. H04M 1/60; H04M 9/00
[52] U.S. Cl. ............................... 379/167; 379/10; 379/11; 455/461; 455/462; 455/450; 455/452; 455/552
[58] Field of Search ........................... 455/561–562, 455/462, 554–555, 426, 445, 450, 452, 453, 461, 403, 422, 550; 379/167, 10, 11

[56]            References Cited

U.S. PATENT DOCUMENTS

| 5,127,042 | 6/1992 | Gillig et al. ........................... 455/552 |
| 5,260,988 | 11/1993 | Schellinger et al. ..................... 455/552 |
| 5,353,331 | 10/1994 | Emery et al. ........................... 455/461 |
| 5,367,558 | 11/1994 | Gillig et al. ........................... 455/552 |
| 5,428,668 | 6/1995 | Dent et al. .............................. 455/452 |
| 5,442,680 | 8/1995 | Schellinger et al. ..................... 455/462 |
| 5,469,496 | 11/1995 | Emery et al. ........................... 455/461 |
| 5,488,649 | 1/1996 | Schellinger et al. ..................... 455/462 |
| 5,535,259 | 7/1996 | Dent et al. .............................. 455/452 |
| 5,581,597 | 12/1996 | Dent et al. .............................. 455/450 |

FOREIGN PATENT DOCUMENTS 0 225 607  12/1986  European Pat. Off. .
0 583 232   8/1993  European Pat. Off. .

*Primary Examiner*—Curtis A. Kuntz
*Assistant Examiner*—Duc Nguyen
*Attorney, Agent, or Firm*—Foley & Lardner

[57]            ABSTRACT

In a personal handy phone system, a private PHS base station is communicable with both a private PHS terminal and a public PHS terminal. The private PHS base station intermittently transmits and receives a first control signal having a first frequency in a predetermined cycle and at a predetermined interval to communicate with the private PHS terminal. The private PHS base station intermittently transmits and receives a second control signal having a second frequency different from the first frequency in the predetermined cycle and at the predetermined interval to communicate with the public PHS terminal when the first control signal is neither transmitted nor received.

4 Claims, 5 Drawing Sheets

PERSONAL HANDY PHONE SYSTEM

BACKGROUND OF THE INVENTION

This invention relates to a personal handy phone system (PHS) and, in particular, to a private PHS used in a local area.

A conventional PHS comprises a public PHS base station or cell station (referred to as a public CS hereinafter) directly connected to a public PHS network, and a private PHS base station or cell station (referred to as a private CS hereinafter) connected through a private branch exchange (PBX) to the public PHS network. The public CS has a public service area and communicates with a public PHS terminal or personal station (referred to as a public PS hereinafter) located within the public service area by the use of a first control signal. On the other hand, the private CS has a private service area covering a local area and communicates with a private PHS terminal or personal station (referred to as a private PS hereinafter) located within the private service area by the use of a second control signal having a frequency different from that of the first control signal.

With the above-mentioned structure, the private CS can not communicate with a public PS located within the private service area. This is because the second control signal used in communication between the private CS and the private PS located within the private service area has a frequency different from that of the first control signal used by the public CS. In other words, the public PS can not be used within the local area for communication with the private CS. In order to use the public PS within the local area, an additional public CS connected to the public PHS network must be located within the local area together with the private CS.

SUMMARY OF THE INVENTION

It is an object of this invention to provide a personal handy phone system which enables communication between a private PHS base station and a public PHS terminal.

It is another object of this invention to provide a personal handy phone system which does not require a public PHS base station located within a local area in addition to a private PHS base station.

It is still another object of this invention to provide a personal handy phone system in which a public PHS network is accessible from a public PHS terminal located within a local area.

According to a gist of this invention, there is provided a personal handy phone system comprising a private branch exchange network including a private branch exchange connected to a public PHS network and a private PHS base station connected to the private branch exchange, wherein the private PHS base station comprises first transmit/receive means for intermittently transmitting and receiving a first control signal having a first frequency in a predetermined cycle and at a predetermined interval, and second transmit/receive means for intermittently transmitting and receiving a second control signal having a second frequency different from the first frequency in the predetermined cycle and at the predetermined interval when the first control signal is neither transmitted nor received.

According to another gist of this invention, there is provided a method of controlling a personal handy phone system comprising a private branch exchange network including a private branch exchange connected to a public PHS network and a private PHS base station connected to the private branch exchange, the method comprising the step of making the private PHS base station intermittently transmit and receive a first control signal having a first frequency in a predetermined cycle and at a predetermined interval, and the step of making the private PHS base station intermittently transmit and receive a second control signal having a second frequency different from the first frequency in the predetermined cycle and at the predetermined interval when the first control signal is neither transmitted nor received.

DESCRIPTION OF THE PREFERRED EMBODIMENT

Figure 1:
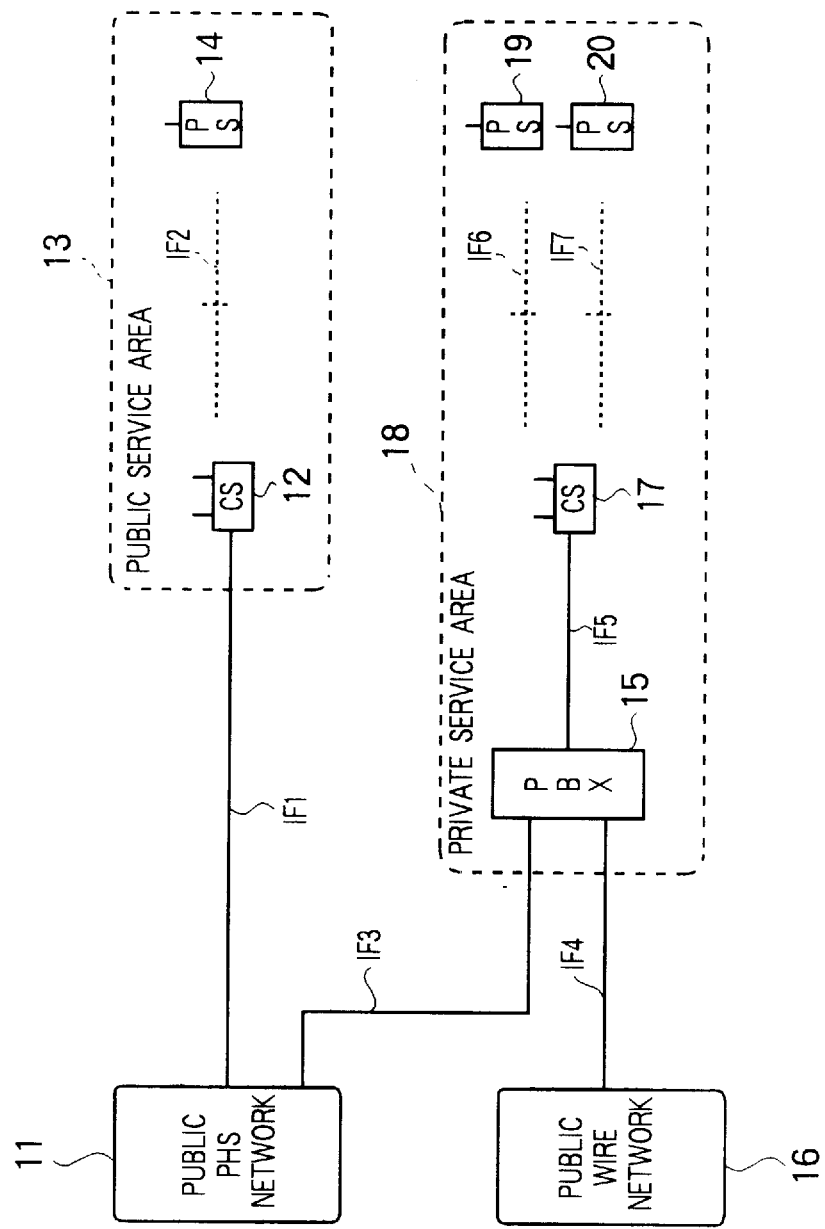
FIG. 1 is a block diagram of a personal handy phone system according to a preferred embodiment of this invention.

Referring to FIG. 1, description will be made as regards a personal handy phone system (PHS) according to a preferred embodiment of this invention. The PHS comprises a public PHS network 11 and a public PHS base station (hereinafter called a public CS) 12 connected to the public PHS network 11 through a first interface IFI. The public CS 12 has a public service area 13 and is communicable with a public PHS terminal (hereinafter called a public PS) 14 located within the public service area 13 through a second interface IF2. A private branch exchange (hereinafter abbreviated to PBX) 15 is connected to the public PHS network 11 through a third interface IF3 and to a public wire network 16 through a fourth interface IF4. A common PHS base station (hereinafter called a common CS) 17 is connected to the PBX 15 through a fifth interface IF5. A combination of the PBX 15 and the common CS 17 forms a local area telephone network. The common CS 17 has a private service area 18 covering a local area and is communicable with a public PS 19 and a private PS 20, both of which are located within the private service area 18, through sixth and seventh interfaces IF6 and IF7, respectively.

The first and the third interfaces IFI and IF3 are of the type set forth in TTC Standard Q.931-b for connection between a public CS and a PHS exchange. The second and the sixth interfaces IF2 and IF6 are public control carriers (air interfaces based on ARIB Standard RCR-STD28 for public). The fourth interface IF4 is an analog-to-digital interface. The fifth interface IF5 is a private CS interface. The seventh interface IF7 is a local area control carrier (air interface based on ARIB Standard RCR-STD28 for private).

Figure 2:
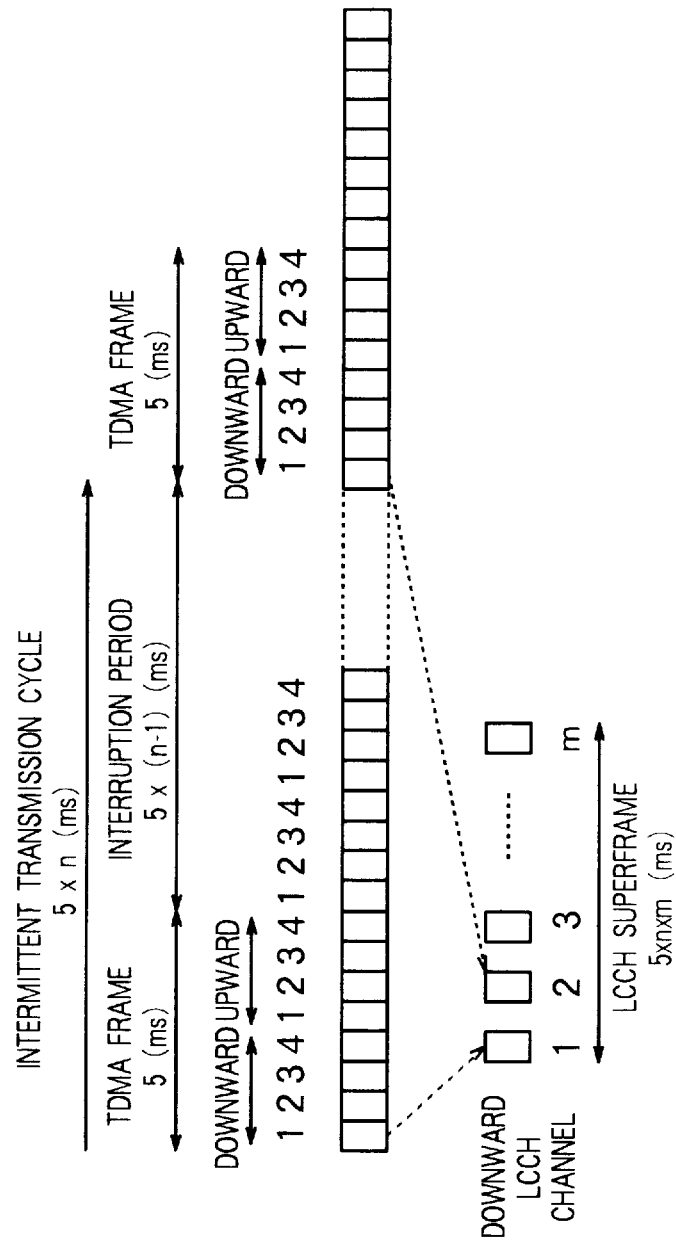
FIG. 2 is a view for describing a control signal used in a public PHS base station illustrated in FIG. 1.

Referring to FIG. 2, description will be made as regards an operation of the public CS 12. The public CS 12 and the public PS 14 communicates with each other by the use of a TDMA (Time Division Multiple Access) system. A single TDMA frame (5 ms) has eight time slots. Among those, the preceding four time slots are used in transmission of downward control information while the following four time slots are used in transmission of upward control information. Thus, the public CS 12 can simultaneously communicate with four public PSs including the public PS 14.

In the PHS, a plurality of public CSs, n in number, including the public CS 12 transmit and receive the control information by the use of the same frequency. Accordingly, the public CS 12 carries out transmission and reception of TDMA frames once in every (5×n) ms. Specifically, after transmission and reception of a control signal having a single TDMA frame, the public CS 12 stops transmission and reception for a time duration corresponding to (n−1) TDMA frames. In other words, the public CS 12 repeatedly carried out an intermittent operation in a cycle of (5×n) ms at an interval of 5 ms. It is noted here that a logical control channel (LCCH) has a superframe of a length (5×n×m (ms)) corresponding to an integral multiple of the single TDMA frame. For example, n and m are equal to 30 and 8 in private, respectively, while n and m are equal to 20 and 12 in public, respectively.

Figure 3:
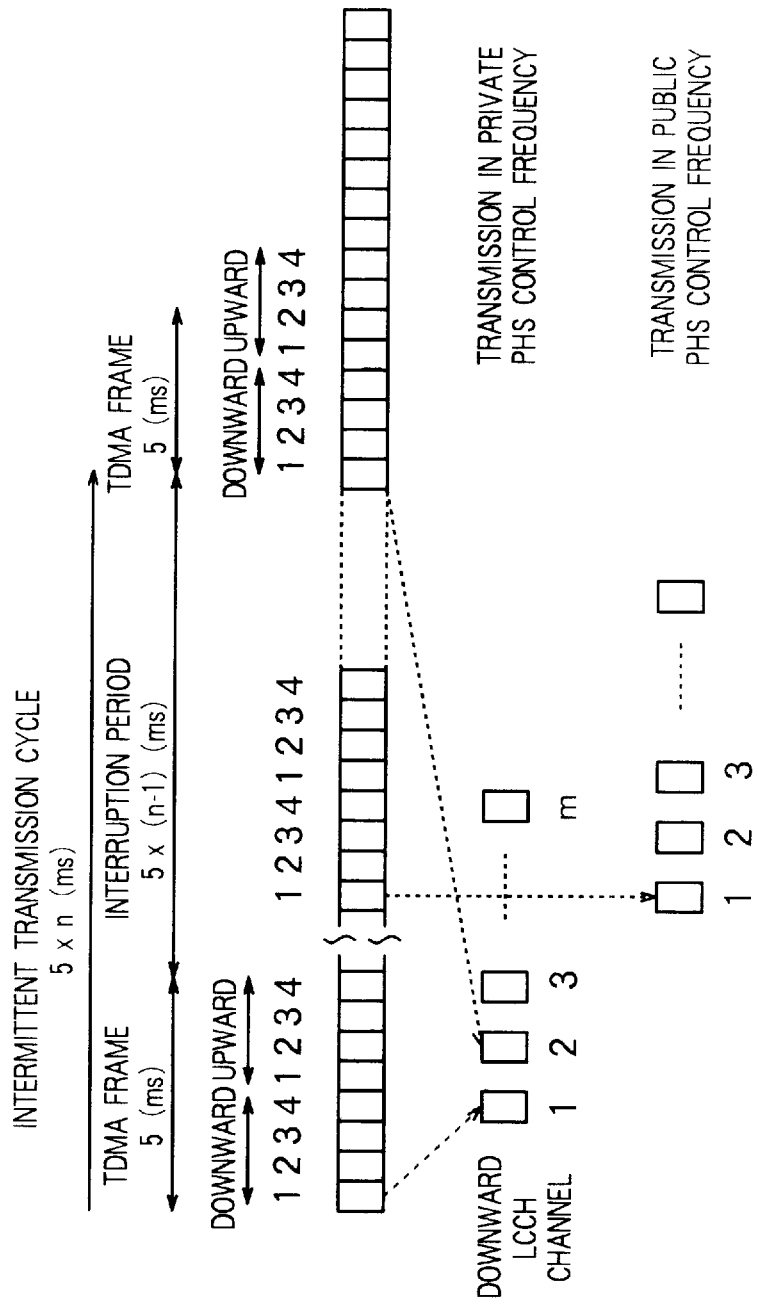
FIG. 3 is a view for describing another control signal used in a common PHS base station illustrated in FIG. 1.
Figure 4:
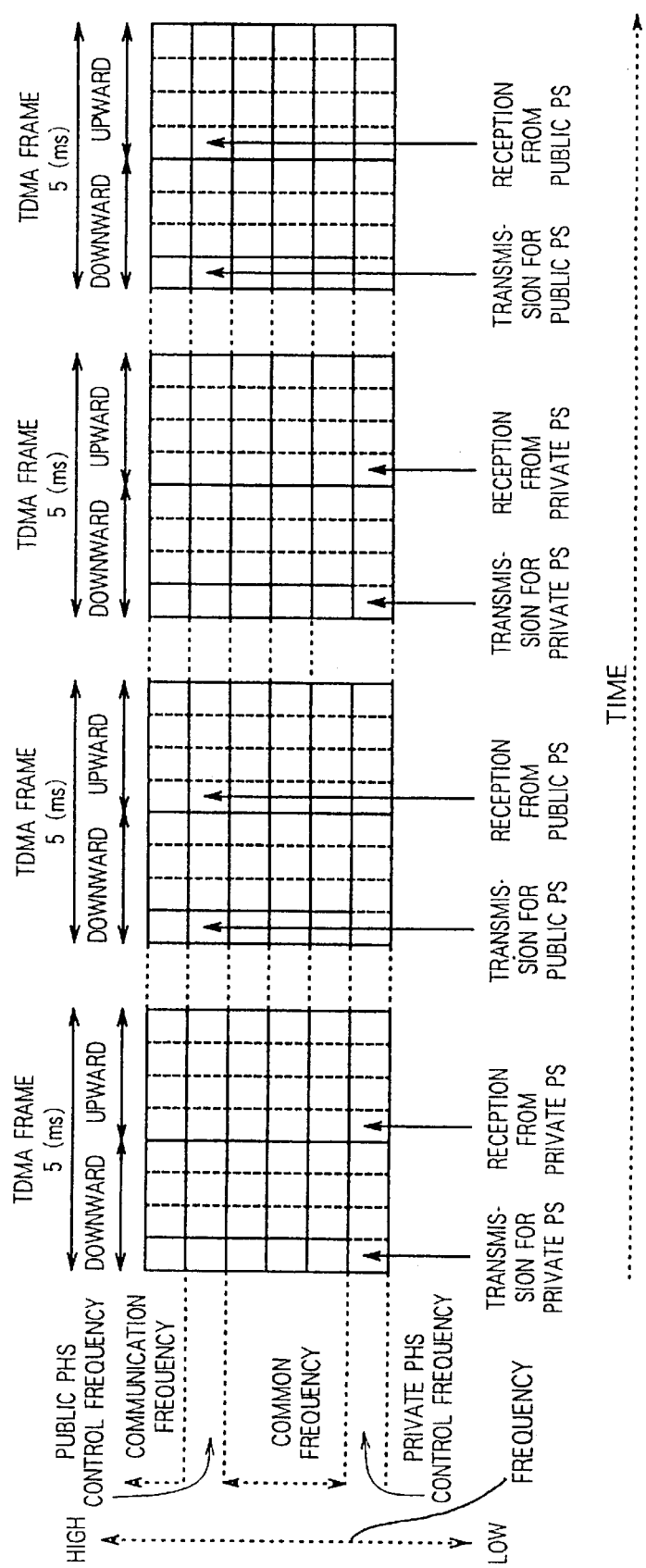
FIG. 4 is a view for describing an operation of the common PHS base station illustrated in FIG. 1.

Referring to FIGS. 3 and 4, an operation of the common CS 17 will be described. In the PHS, the private PHS network is assigned with two private PHS control frequencies and one public PHS control frequency. Basically, the common CS 17 similarly operates as the public CS 12. Specifically, the common CS 17 communicates with the private PS 20 by the use of an assigned time slot (one TDMA frame) assigned to the common CS 17. In this event, the common CS 17 communicates with the private PS 20 by the use of one of the private PHS control frequencies assigned thereto. In addition, the common CS 17 communicates with the public PS 19 by the use of another time slot except the assigned time slot. In this event, the common CS 17 uses the public PHS control frequency assigned thereto. Thus, the common CS 17 is enabled to carry out transmission and reception with both of the public PS 19 and the private PS 20.

Figure 5:
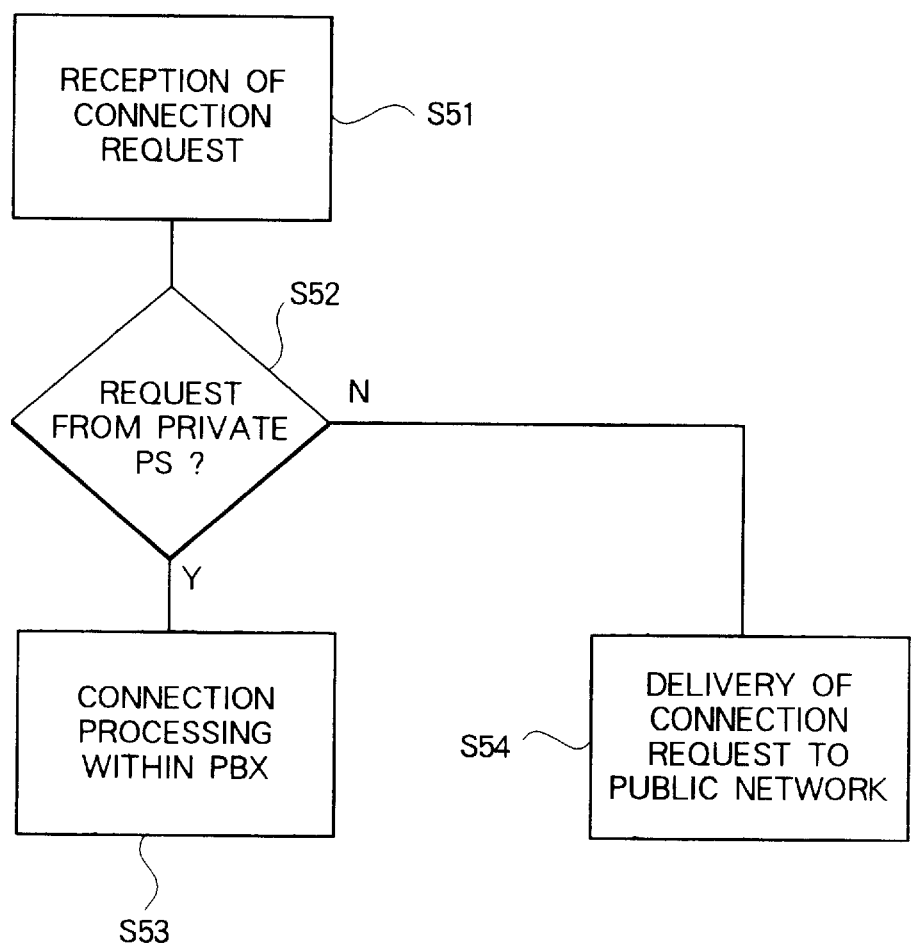
FIG. 5 is a flow chart for describing the operation of the common PHS base station illustrated in FIG. 1.

Upon reception of a line connection request in an upward control signal, the common CS 17 operates in the manner as illustrated in FIG. 5. Specifically, when the common CS 17 receives the line connection request (step S51), judgment is made whether the line connection request is delivered from the public PS 19 or the private PS 20 (step S52). The common CS 17 informs the PBX 15 of a result of judgment. In case where the line connection request is delivered from the private PS 20, the PBX 15 carries out connection processing inside the PBX 15. On the other hand, in case where the line connection request is delivered from the public PS 19, the PBX 15 delivers the line connection request to the public PHS network 11.

In the above-described PHS of this invention, line connection between the public PS 19 located within the private service area 18 and the PHS network 11 is achieved without provision of an additional public CS within the private service area 18.

It will be understood that this invention is not restricted to the foregoing preferred embodiment but includes various modifications without departing from the gists of this invention. For example, the private CS 17 may be made to be communicable with any private PS belonging to another private PHS network, instead of the public PS located within the private service area.

What is claimed is:

1. A personal handy phone system comprising a private branch exchange network including a private branch exchange connected to a public PHS network and a private PHS base station connected to said private branch exchange, wherein said private PHS base station comprises:

first transmit/receive means for intermittently transmitting and receiving a first control signal having a first frequency in a predetermined cycle and at a predetermined interval; and second transmit/receive means for intermittently transmitting and receiving a second control signal having a second frequency different from said first frequency in said predetermined cycle and at said predetermined interval when said first control signal is neither transmitted nor received.

2. A personal handy phone system as claimed in claim 1, wherein said private PHS base station further comprises:

judging means for judging whether a connection request in each of said first and said second control signals received by said private PHS base station is directed to said private branch exchange or said public PHS network; and informing means for informing the result of judgment to said private branch exchange.

3. A method of controlling a personal handy phone system comprising a private branch exchange network including a private branch exchange connected to a public PHS network and a private PHS base station connected to said private branch exchange, said method comprising the step of making said private PHS base station intermittently transmit and receive a first control signal having a first frequency in a predetermined cycle and at a predetermined interval, and the step of making said private PHS base station intermittently transmit and receive a second control signal having a second frequency different from said first frequency in said predetermined cycle and at said predetermined interval when said first control signal is neither transmitted nor received.

4. A method of controlling a personal handy phone system as claimed in claim 3, said method further comprising the steps of:

making said private PHS base station judge whether a connection request in each of said first and said second control signals received by said private PHS base station is directed to said private branch exchange or said public PHS network; and informing the result of judgment to said private branch exchange.

* * * * *

UNITED STATES PATENT AND TRADEMARK OFFICE
CERTIFICATE OF CORRECTION

PATENT NO. : 5,818,918
DATED : October 6, 1998
INVENTOR(S) : Shigeo Fujii

It is certified that error appears in the above-identified patent and that said Letters Patent is hereby corrected as shown below:

<u>Title page,</u>
Item [30], please correct the following:

-- [30]      Foreign Application Priority Data
     June 1, 1995      [JP]      Japan............7-134965 --

Signed and Sealed this

Twenty-eighth Day of December, 2004

JON W. DUDAS
*Director of the United States Patent and Trademark Office*